United States Patent
Fakhraei et al.

(10) Patent No.: US 9,928,086 B2
(45) Date of Patent: Mar. 27, 2018

(54) SYSTEM AND METHOD FOR SOFTWARE FEATURE MANAGEMENT

(71) Applicant: Corel Corporation, Ottawa (CA)

(72) Inventors: Alireza Fakhraei, Ottawa (CA); Matthew Robert Schnarr, Ottawa (CA)

(73) Assignee: Corel Corporation, Ottawa, Ontario (CA)

(*) Notice: Subject to any disclaimer, the term of this patent is extended or adjusted under 35 U.S.C. 154(b) by 0 days.

(21) Appl. No.: 13/826,836

(22) Filed: Mar. 14, 2013

(65) Prior Publication Data

US 2014/0282474 A1 Sep. 18, 2014

(51) Int. Cl.
*G06F 9/44* (2006.01)
*G06F 9/445* (2018.01)

(52) U.S. Cl.
CPC ................. *G06F 9/44505* (2013.01)

(58) Field of Classification Search
CPC ... G06F 8/65; G06F 8/61; G06F 21/10; G06F 8/64; G06F 17/30575; G06F 17/30174; G06F 17/30194; G06F 17/30233; G06F 17/30557; G06F 9/44505
USPC ................................................. 717/170, 171
See application file for complete search history.

(56) References Cited

U.S. PATENT DOCUMENTS

| | | | | |
|---|---|---|---|---|
| 6,134,593 | A * | 10/2000 | Alexander et al. | 709/229 |
| 6,151,643 | A * | 11/2000 | Cheng et al. | 710/36 |
| 6,542,943 | B2 * | 4/2003 | Cheng et al. | 710/36 |
| 7,752,139 | B2 * | 7/2010 | Hu | 705/59 |
| 7,921,059 | B2 * | 4/2011 | Chicks et al. | 705/59 |
| 8,224,750 | B1 * | 7/2012 | Bennett et al. | 705/59 |
| 2005/0027657 | A1 * | 2/2005 | Leontiev et al. | 705/59 |
| 2005/0055309 | A1 * | 3/2005 | Williams et al. | 705/40 |
| 2007/0150964 | A1 * | 6/2007 | Orthlieb | G06F 21/629 726/27 |
| 2009/0089752 | A1 * | 4/2009 | Tristram | 717/120 |
| 2009/0260002 | A1 * | 10/2009 | Volovic et al. | 717/174 |
| 2011/0145789 | A1 * | 6/2011 | Rasch et al. | 717/121 |
| 2013/0067447 | A1 * | 3/2013 | Sannidhanam et al. | 717/169 |

* cited by examiner

*Primary Examiner* — Anna Deng
(74) *Attorney, Agent, or Firm* — Rosenberg, Klein & Lee

(57) ABSTRACT

A method includes providing a computer readable code configured to perform a process of feature management. The computer code includes one or more configurable features having a feature property. The feature property includes a state. The method also includes: running the computer readable code on the local computer; connecting by the local computer with a feature computer server; identifying an instance of an installed computer program including the computer readable code, and retrieving a feature record associated with the installed computer program or the member from the feature server; and configuring a state of one or more of a set of the feature properties of the installed computer program based on a retrieved feature record. A system to perform the method is also described.

23 Claims, 2 Drawing Sheets

SYSTEM AND METHOD FOR SOFTWARE FEATURE MANAGEMENT

FIELD OF THE INVENTION

The invention relates to feature management and more particularly to the management of features of a computer program.

BACKGROUND OF THE INVENTION

Computer programs are often made available about the same time in more than one version. The different versions of a computer program generally vary by the number of features made available to a user of the computer program. The most common way to install a given version of a computer program is to install the entire framework of that version of the computer program. Accordingly, when upgrading an already installed computer program, a successive installation usually replaces the existing computer program framework during the subsequent installation. This user process of upgrading an already installed computer program by replacing the currently installed program framework is inefficient.

There is a need for a more efficient system and method to provide a modified or upgraded computer program which offers a different set of features, without needing to replace the underlying framework of an already installed computer program.

SUMMARY OF THE INVENTION

According to one aspect, the invention features a method beginning with the step of providing a computer readable non-transitory storage medium including a computer readable code configured to run on a local computer and configured to perform a process of feature management. The computer code includes one or more configurable features having a feature property. The feature property includes a state. The method includes the steps of: running the computer readable code on the local computer; connecting by the local computer with a feature computer server; identifying an instance of an installed computer program including the computer readable code, and retrieving a feature record associated with the installed computer program or the member from the feature server; and configuring the state of one or more of a set of the feature properties of the installed computer program based on a retrieved feature record.

In one embodiment, the step of identifying an instance of an installed computer program includes identifying an instance of an installed computer program by an identification string.

In another embodiment, the identification string includes a serial number.

In yet another embodiment, the identification string includes an identification of the local computer.

In yet another embodiment, the identification string includes a user name.

In yet another embodiment, the user name identifies a subscription account.

In yet another embodiment, the state includes an enabled state or a disabled state.

In yet another embodiment, the state further includes a displayed or a hidden state.

In yet another embodiment, following the step of configuring a state of one or more of the set of the feature properties, the method further includes the step of displaying at least one of the features with an indication of the state of the feature property of the feature.

In yet another embodiment, the step of displaying at least one of the features includes a displayed color or brightness of color.

In yet another embodiment, the step of displaying at least one of the features includes a displayed superimposed shaded box.

In yet another embodiment, the step of configuring a state of one or more of the set of the feature properties further includes the step of displaying at least one of the features with an indication of a presently unavailable feature.

In yet another embodiment, the method further includes an instruction on how to enable the feature.

In yet another embodiment, the instruction on how to enable the feature includes an instruction on how to purchase a version of the computer program offering the feature or an instruction on how to purchase a subscription to a version of the computer program offering the feature.

According to another aspect, the invention features a system which includes a computer configured to run a computer readable non-transitory storage medium including a computer readable code configured to run on the computer and to perform a process of feature management. The computer readable code is configured to run on the local computer, to connect by the local computer with a feature computer server, to identify an instance of an installed computer program including the computer readable code, and to retrieve a feature record associated with the installed computer program or the member from the feature server, and to configure the state of one or more of a set of the feature properties of the installed computer program based on a retrieved feature record.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
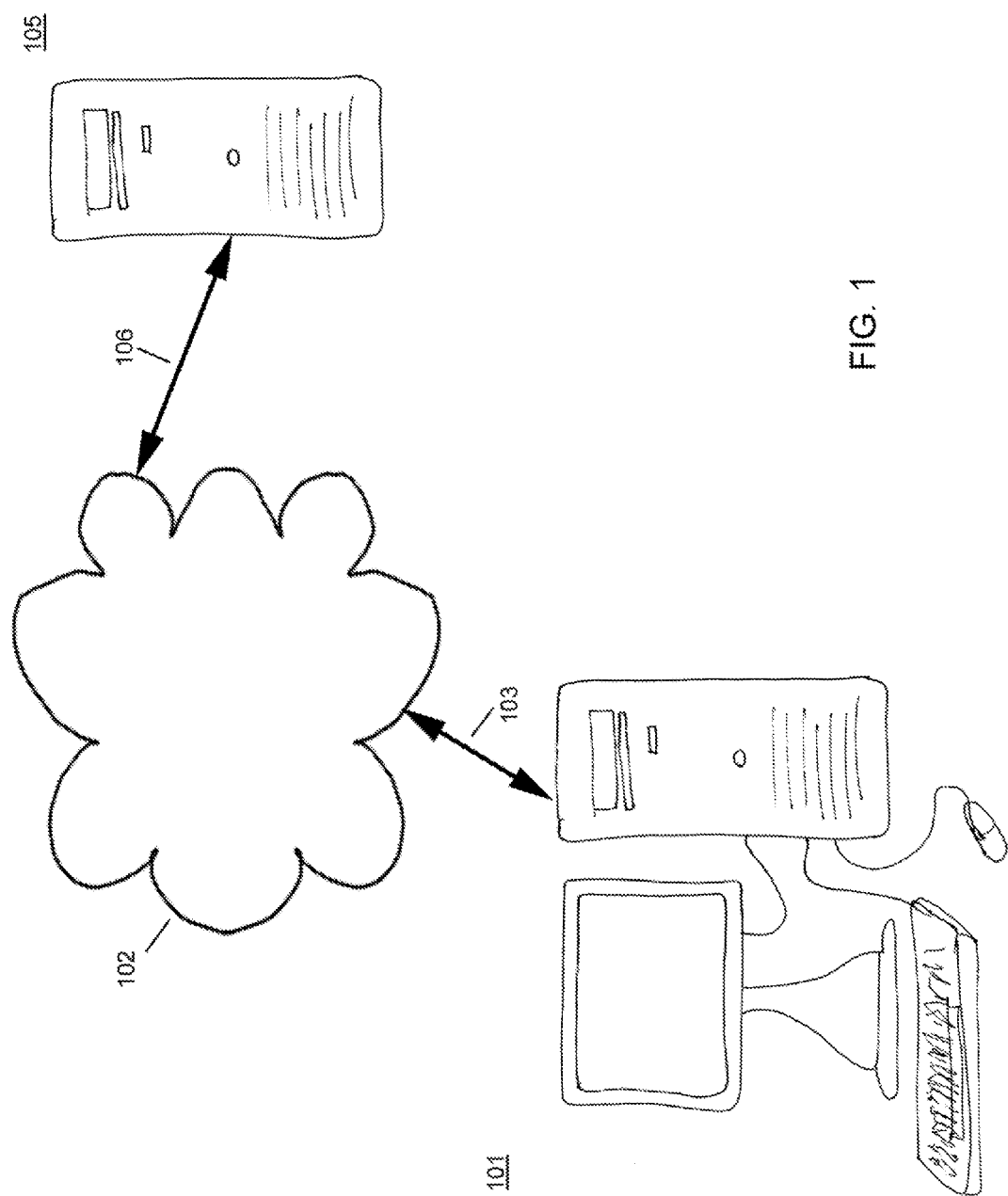
FIG. 1 shows a block diagram of one exemplary system suitable to perform the processes described herein.

As described hereinabove, during an installation of a different version of the same program (e.g. a version offering a premium feature set), a computer program is typically re-installed as a new computer program framework which completely replaces the installed computer program framework. Such a complete replacement of the framework is inefficient. The framework replacement approach means delivery of a relatively large amount of computer code, either by download, as over the Internet, or by an actual transfer of physical media such as by a distribution CD or DVD.

An alternative computer distribution model installs a full featured framework of the computer program. Many of the features of the computer program can have associated with the features a "feature property". The feature property can have states such as, for example, an enabled state, a hidden state, or a disabled state (i.e. non-enabled). There can also be a displayed state, or a displayed state with an indication. Features can be displayed, for example, with an indication of the current state of one or more configurable features. Such displays can include an indication of feature availability, feature non-availability, or an offer for purchase of a currently non-enabled feature. The indication can be a graphical on-screen indication, such as, for example, a different color font of the text of a displayed feature name, and/or a shaded background for foreground brightness level or color, displayed color, brightness of color, a displayed superimposed shaded box, etc. associated with a feature selection having feature property currently set to a certain feature property state. While the feature property can be similar in nature to other properties of the computer program, such as, for example, properties of objects, the feature property by design, cannot typically be accessed by a user of the computer program, nor can its state typically be set or changed by the user of the installed computer program. The states of one or more of the property features can be pre-set for a distribution copy of the computer program, such as a user might purchase in the form of a DVD or by online download of computer program installation file.

The states of one or more of the property features can be changed by the computer server, such as, for example, a feature computer server on the Internet. Following installation of the computer program, the computer program can connect to the "feature server" to determine what features are available to a user of any particular installation of the computer program. The computer program can connect one or more times to the feature server. The feature server can identify by any suitable means which particular installation of a computer program is connecting to the server. The computer program can then retrieve a corresponding record for that installed computer program to configure one or more configurable features of the computer program as per the feature property state information contained within the downloaded or otherwise accessed property feature record. For example, an automated request (transparent to the user) for the current states of a set of property features for a particular installed computer program can be accompanied, for example, by a serial number associated with that particular installed computer program, a computer identification of the computer on which the computer program is installed, or a user name based on a user logon to the installed program. For any given query, the feature server can return information which then configures the states of property features of a set or subset of configurable property features. The installed computer framework is thus remotely feature configurable by the feature server and the underlying program framework no longer needs to be replaced to change the availability of one or more of the configurable features of the computer program.

FIG. 1 shows a block diagram of one exemplary computer system suitable for performing the processes described herein. A computer, typically a local computer 101 (e.g. a client computer) is connected via any suitable data connection 103 (e.g. Cable modem, WiFi, WiMAX, FioS, DSL, local or wide area Ethernet network connections, etc.) typically via an Internet connection, to any suitable cloud 102 (typically the Internet). A computer server configured as a feature server 105 is also connected to the cloud 102 via any suitable connection 106. The computers, local computer 101, and feature server 105, need not be of the same type computer.

Figure 2:
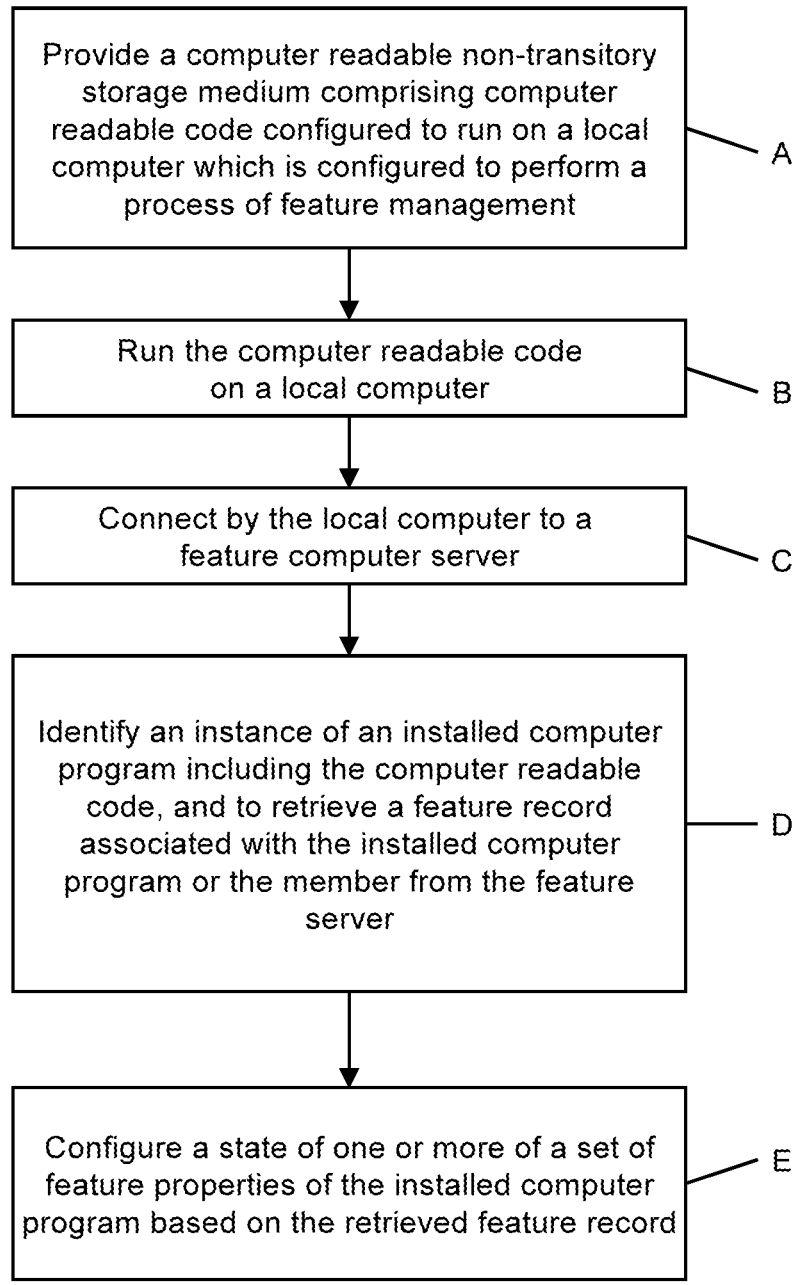
FIG. 2 shows a flow chart of one exemplary embodiment of a process to manage the features of a computer program.

FIG. 2 shows a flow chart of one exemplary embodiment of the process. The process for management of features of a computer program includes the steps of: A) Provide a computer readable non-transitory storage medium comprising a computer readable code configured to run on a local computer which is configured to perform a process of feature management; B) Run the computer readable code on a local computer; C) Connect by the local computer to a feature computer server; D) Identify an instance of an installed computer program including the computer readable code, and to retrieve a feature record associated with the installed computer program or the member from the feature server; and E) Configure a state of one or more of a set of feature properties of the installed computer program based on the retrieved feature record. The steps of the exemplary process can be better understood in the examples and detailed description hereinbelow.

EXAMPLE 1

A computer software company offers a computer program in a standard and a premium version. A user obtains one distribution version of the computer program (either standard or premium), such as by purchase of downloadable software or by purchasing a distribution disc such as a distribution DVD. Either by information entered during an online purchase, or by initial online registration, a record is created at the feature server for that user's purchase which indicates whether the user purchased a standard or premium version of the computer program. The computer program is then installed on any suitable computer. During program startup (following installation of the computer program) and/or a user logon to the computer program, an automated request (transparent to the user) for the current states of a set of property features is sent to the feature server. The feature server returns information to the computer program which configures the states of property features of a set of property features of the computer program. In example 1, the information returned by the property feature servers configures the features of the installed computer program consistent with the most recent purchase of a standard or premium version of the computer program.

One advantage of a computer program having remotely configurable property features is that a software company can change the feature set available at any level of purchase at any time. Continuing with the example of a computer program distributed in both a standard version, and a premium version which offers more features than the standard version, at some later date following the first use of the computer program, either the standard user or the premium user can be offered a different, typically larger, set of available features. In other words, the company can later re-define what features are made available by the different featured versions of a program.

Also, in the case of unauthorized distribution of serial numbers as might become known to the software company, features can be turned off, such as, for example, to render known "pirated" installations of the computer program to a limited or severely limited state of use.

Subscription Based Features:

Another application for a complete framework having all features installed with at least some of the features controlled by a property feature as described herein is a subscription based purchase program. In a subscription based purchase program, a user purchases a level of features, such as by purchase subscription of a standard subscription or a premium subscription. By contrast with the purchase of a feature version as described hereinabove, a subscription purchase typically includes both a feature set (e.g. a version with certain user available features) and a time duration for the availability of those features. In a subscription embodiment, the user feature record or computer ID feature record further includes the authorized time duration for the subscription purchase. In some cases, the purchase model could be combined with a subscription model, where some features of a previously purchased version can be made available on a time limited subscription basis (generally including an ability to re-subscribe as desired). There could also be made available an option to purchase a program version following a subscription period.

EXAMPLE 2

A user installs a computer program. The user, without any connection to a feature server, has available the features of the standard version of the computer program. The user then purchases a one year subscription to the premium version of the computer program under a user name. Following the purchase of the subscription, the user starts the computer program. The user enters a user name into a logon field of the computer program at which point, the computer program connects to the feature server and requests (transparent to the user) a current list of the states of property features, wherein, if still within the one year subscription period of time, the feature server returns information to the computer program which then configures the states of property features of the computer program for the premium version of the computer program. Beyond one year from the start date of the one year subscription (if a renewal has not yet been purchased) the feature server returns information to the computer program which configures the states of property features for the standard version of the computer program. There can also be information returned by the feature server that can prompt the user to renew the subscription. Some computer programs installed only for use by subscription can be feature limited or severely feature limited following expiration, without timely renewal, of a subscription program.

Offer for Feature Purchase and/or Computer Program Upgrade:

Yet another aspect of feature management by feature server is the ability for the computer program to offer presently unavailable features to a user for purchase. Such offers can range from an indication of availability, an offer with additional information (e.g. a "teaser" in advertising parlance), to a full offer for sale with information and user selectable link or clickable link. The offer can be for individual premium features, selected sets of premium features, a premium version of the computer program, or a premium subscription to the computer program. Such offers can be made during normal use of the computer program. In some cases, there can be user settable options where such offers can be optionally displayed or not displayed by choice of the user of the computer program.

A drop-down menu of features or a window of feature selections (also called a docker) can list features which are not enabled. In one contemplated embodiment, a user indicating an interest in a non-enabled (disabled) feature, such as by a user "mouse over" or mouse "hover" or any other user attempt to click on or otherwise to select the presently non-enabled feature, can cause the computer program to generate a message or instruction indicating what type of purchase or version upgrade would enable that feature. Further, the message can include a user controlled input option, typically by a clickable link, which can direct the user to a purchase site, such as a purchase website. Following a successful purchase of the feature, or more likely of a program version or program subscription package that includes the desired feature, the user's record is updated at the feature server. The computer program, alerted to a possible purchase by operation of the purchase link, can connect to the feature server to download the latest record. If the user made a successful purchase, the user's updated record will reflect the newly available features and the computer program will then make available to the user the newly purchased feature as an enabled feature. Alternatively or additionally, the next time the computer program is started and/or the next time the user logons to the computer program, newly purchased features can show as available features.

EXAMPLE 4

A user "mouse over" of a premium feature not currently available on the user's purchased version of the computer program and/or through their level of user subscription causes a prompt to show on the computer screen. The prompt notifies the user that the feature of the user's interest is available in the premium version of the computer program. A clickable link offers the user a path to purchase a premium subscription to the computer program. The user follows the path and successfully completes the purchase of a premium subscription. Either by detecting the user activity of having followed the purchase path to a successfully completed purchase, and/or by a successive program start and/or user logon to the computer program, the program connects to the feature server and retrieves the updated user's record. The original non-enabled feature of interest is now enabled.

There can be a number of ways to show one or more non-enabled features to a user. For example, a non-enabled feature can be displayed in a menu or in a docker in a different color than the enabled features, such as by a grey text font for a non-enabled feature compared with a black font for enabled features. There can also be a translucent box which covers a non-enabled feature. Similarly, premium features can be shown in a different color, such as, for example, a blue text item in a list or in a docker, the blue text denoting premium items compared with a black text for standard features. The brightness or intensity of a colored font could also be modified to indicate an enabled or non-enabled feature. For example, a dimmed brightness or a light shade of the same color could be used to indicate a non-enabled feature, and a "standard" brightness or regular shade of the same color could be used to indicate an enabled feature. In a worst case scenario, such as, for example, for known pirated installations, there could be an opaque box drawn on the screen over one or more features.

Interception of Mouse Clicks:

Computer programs typically identify a feature selection by cursor control, as is typically accomplished by a mouse controlled (user driven) cursor position followed by a mouse click. In such cases one technique to control the access to features is to generate a screen mask which matches a user displayed screen. For a region of the screen about one or more displayed user selectable features, the display mask, which is typically not visible to a user of the screen, can pass or intercept mouse clicks. Thus if a feature is enabled, a user mouse click operates the feature normally. However, if that feature is presently disabled, the mask can intercept any mouse clicks made in an attempt to select the non-enabled feature. Moreover, as described hereinabove, mouse clicks over a non-enabled feature can optionally cause a prompt to be made to the user offering information on what version includes the desired non-enabled feature and/or how to purchase the non-enabled feature.

Features can be defined at build time using "feature groups" which describe the feature state (enabled, disabled, or hidden) for each of the entitlement states (not-started/signed-in, signed-in, and expired).

EXAMPLE

These feature groups can then be applied to each feature as follows:

```
// Premium Feature Group definition
premium =
{
    local_sub          = msf_entry:new{ TrialNotstarted=disabled, TrialNotExpired=disabled, TrialExpired=disabled, Activated=disabled },
    premium_sub        = msf_entry:new{ TrialNotstarted=disabled, TrialNotExpired=enabled, TrialExpired=disabled, Activated=enabled },
    premiumtrial_sub   = msf_entry:new{ TrialNotstarted=disabled, TrialNotExpired=enabled, TrialExpired=disabled, Activated=enabled },
    pure_sub           = msf_entry:new{ TrialNotstarted=disabled, TrialNotExpired=enabled, TrialExpired=disabled, Activated=enabled },
    Subscription       = true
}
// Some feature declarations
Features::Styles::Previews = { "31a3bbff-5364-1483-47d1-c7a9dea84022", Subscription = true }
Features::Color::Styles::ConvertToGrayscale = { "f932ddf7-bb7c-414a-b786-cbd18ad98afc", Subscription = true }
Features::Color::Styles::AdvancedViewOptions = { "cecdb1b4-22ab-949d-40d2-dd837c0bfac9", Subscription = true }
// Some feature status definitions
Features::Styles::Previews.status                    = premium
Features::Color::Styles::ConvertToGrayscale.status   = premium
Features::Color::Styles::AdvancedViewOptions.status  = premium
```

At the server-side entitlements, a product of a build can be uploaded to the server. At run-time the application might query the feature status explicitly, for example:

```
If (FeatureManagment::Features::Color::Styles::ConvertToGrayscale)
    // do something only allowed when convert to grayscale on.
```

Or features can be automatically controlled by the user interface (UI) Framework which supports the enabled, hidden, and disabled (teaser) states automatically by virtue of the feature identifiers matching the UI-Element or control identifiers (e.g. globally unique identifiers (guids) matching the UI-Element or control guids). Suitable guids include those which follow the universally unique identifier (UUID) standard.

Now in more detail, in one exemplary embodiment, the base-class of each UI control supported by the UI Framework includes an aspect or part known as an itemOverlay. In some embodiments, the itemOverlay in this case includes a win32 window whose life-time, appearance, and mouse-click handling are manipulated according to the Feature Status of the particular item to: 1) do nothing (enabled); 2) highlight the item (premium or other reason to draw attention); 3) prevent use, or intercept use to put up some information—for example how to purchase (teaser); or 4) hide completely (hidden).

It is unimportant what operating system is used. Computer programs having feature properties and process techniques as described herein can be written for use with any suitable computer operating system. The Windows™ operating system available from the Microsoft Corporation of Redmond, Wash. is but one example of a suitable operating system.

It is unimportant to the processes described herein what type of local computer (e.g. a client computer) is used by a user. It is also unimportant to the processes described herein what type of computer is used by the feature computer server. Typically, the local computer is physically accessible by a user of the local computer. A computer can include any suitable type of computer having any suitable operating system. It is further contemplated that the inventive techniques as described herein can be practiced on any suitable computer based device having a computer processor or firmware which simulates the functions of a computer processor.

In most embodiments, the feature server identifies an instance of the installed computer program. The identification can take place in both non-subscription (e.g. purchased) installations as well as for subscription based accounts. In one embodiment, the step of identifying an instance of an installed computer program includes identifying an instance of an installed computer program by an identification string. The identification string can be any suitable type of identification string and can include numbers, and/or characters, and/or symbols. The identification string can be a serial number, such as a serial number entered by a user following purchase of a computer program. The identification string can also be an identification of a local computer, such as for example a name or number or manufacturer hardware serial number or serial number or any other suitable identification of an installed instance of an operating system. The identification string can be a user name or an identification string which represents a login by a particular user at a local computer. The identification of a particular user can also be used to identify a particular subscription account.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A method comprising:

installing to a computer readable non-transitory storage medium a full featured framework of a computer program having a plurality of features, a predetermined subset of the plurality of features being associated with feature properties that define whether a feature within the plurality of features is at least one of an enabled state, a disabled state, or a hidden state;

executing the full featured framework of the computer program upon a computer coupled to the computer readable non-transitory storage medium wherein the computer program connects via a network to a feature server;

identifying upon the feature server a unique identity associated with the installed full featured framework of the computer program;

retrieving from the feature server a set of feature properties associated with the unique identity;

configuring the predetermined subset of the plurality of features of the already installed full featured framework of the computer program post-installation in dependence upon only the retrieved set of feature properties and the already installed full featured framework of the computer program; and transmitting to the feature server a change with respect to enabling a feature property in response to a user initiated request to enable the feature property and an associated enabling of a feature within the plurality of features controlled by the feature property, wherein the user initiated request is generated in response to an action of the user within a graphical user interface displayed to the user during their normal use of the full featured framework of the computer program which displays at least a subset of the currently enabled features of the full featured framework of the computer program.

2. The method according to claim 1, wherein the unique identity associated with the computer program is a unique access credential of a user logon to the installed full featured framework of the computer program.

3. The method according to claim 1, wherein the states of one or more program features are pre-set for an initial distribution version of the software program purchased and installed to the computer readable non-transitory storage medium.

4. The method according to claim 1, wherein the set of feature properties associated with the unique identity are established based upon a version of the software program purchased.

5. The method according to claim 1, wherein the set of feature properties associated with the unique identity are established based upon a subscription level of at least one of a user of the full featured framework of the computer program and the full featured framework of the computer program and a time limit associated with the subscription for availability of the set of feature properties.

6. The method according to claim 1, wherein the set of feature properties associated with the unique identity are modified in response to at least one of a purchase of a feature of the full featured framework of the computer program and an upgrade of the full featured framework of the computer program.

7. The method according to claim 1, wherein the set of feature properties associated with the unique identity stored on the feature server can be turned off by an authorised party in dependence upon a determination by the authorised party with respect to the validity of the installation of the full featured framework of the computer program.

8. The method according to claim 1, wherein the set of feature properties associated with the unique identity stored on the feature server can be adjusted by an authorised party in dependence upon a determination by the authorised party with respect to the validity of the installation of the full featured framework of the computer program to render the installed computer program to a limited state of use.

9. The method according to claim 1, wherein executing the full featured framework of the computer program upon the computer generates a screen mask that overlays a displayed graphical user interface generated by the computer program that allows user actions with respect to a first predetermined portion of the graphical user interface in dependence upon the states of the set of feature properties; and blocks user actions with respect to a second predetermined portion of the graphical user interface in dependence upon the states of the set of features.

10. The method according to claim 1, wherein a feature associated with a feature property is displayed to a user of the full featured framework of the computer program in dependence upon the state of the feature property.

11. The method according to claim 1, wherein motion by the user of a cursor during their normal use of the computer program over a feature not currently available triggers a prompt to the user indicating the availability of the feature by either purchasing that feature or purchasing an enhanced feature set with and increased subscription level which includes the feature.

12. The method according to claim 1, wherein configuring the installed full featured framework of the computer program in dependence upon the retrieved set of feature properties comprises displaying to a user of the full featured framework of the computer program one or more graphical user interfaces comprising a first set of features of the full featured framework of the computer program that are enabled and allowing the user to access and exploit the first set of features;

a second set of features of the full featured framework of the computer program that are disabled and not allowing the user to access and exploit the second set of features; and not displaying a third set of features of the full featured framework of the computer program; wherein the first, second, and third sets of features are established in dependence upon the set of feature properties.

13. The method according to claim 1, further comprising determining that a feature property relating to a feature within the plurality of features has changed to enable the feature results in the corresponding enabling of said feature absent the at least one of downloading and installation of any software.

14. A method comprising:

providing a feature server storing within a database sets of feature properties, each set of feature properties associated with a unique identity and each feature property having a state, wherein the state is at least one of an enabled state, a disabled state, or a hidden state;

receiving from a remote computer executing an installed full featured framework of a computer program a request for a set of feature properties, the request comprising at least a unique identity associated with the installed full featured framework of the computer program;

transmitting to the remote computer the set of features associated with the unique identity upon validation of the unique identity, wherein the set of feature properties transmitted to the remote computer configure a predetermined sub-set of the features of the already installed full featured framework of the computer program post-installation, the configuration of each feature within the sub-set of the features being made in dependence upon only the state of a feature property within the set of feature properties associated with that feature and the already installed full featured framework of the computer program; and transmitting to the feature server a change with respect to enabling a feature property in response to a user initiated request to enable the feature property and an associated enabling of a feature within the plurality of features controlled by the feature property, wherein the user initiated request is generated in response to an action of the user within a graphical user interface displayed to the user during their normal use of the full featured framework of the computer program which displays at least a subset of the currently enabled features of the full featured framework of the computer program.

15. The method according to claim 14, wherein the unique identity associated with the full featured framework of the computer program is at least one a unique serial number associated with that particular installed full featured framework of the computer program, a unique identification of the computer executing the full featured framework of the computer program, and a unique access credential of a user logon to the installed full featured framework of the computer program.

16. The method according to claim 14, wherein the states of one or more program features are pre-set for an initial distribution version of the software program purchased and installed on the remote computer and registered with the feature server.

17. The method according to claim 14, wherein the set of feature properties associated with the unique identity are modified in response to at least one of a purchase of a feature of the full featured framework of the computer program and an upgrade of the full featured framework of the computer program.

18. The method according to claim 14, wherein the set of feature properties associated with the unique identity stored on the feature server can be turned off by an authorised party in dependence upon a determination by the authorised party with respect to the validity of the installation of the full featured framework of the computer program.

19. The method according to claim 14, wherein the set of feature properties associated with the unique identity stored on the feature server can be adjusted by an authorised party in dependence upon a determination by the authorised party with respect to the validity of the installation of the full featured framework of the computer program to render the installed full featured framework of the computer program to a limited or severely limited state of use.

20. The method according to claim 14, wherein the transmitted set of features associated with the unique identity configure each feature within the sub-set of the features into at least one of:
a first group displaying the feature to a user of the full featured framework of the computer program within a graphical user interface of the computer program and allowing the user to access and exploit the feature;
a second group displaying the feature to a user of the full featured framework of the computer program within a graphical user interface of the computer program and not allowing the user to access and exploit the second set of features; and
a third group not displaying the feature to a user of the full featured framework of the computer; wherein
what features are within the first group, second group, and third group is determined in dependence upon the set of feature properties.

21. The method according to claim 14, further comprising determining that a feature property relating to a feature within the plurality of features has changed to enable the feature results in an adjustment of the screen mask to allow the corresponding enabling of said feature absent the installation of any software.

22. A method comprising:
providing on a computer executing an installed full featured framework of a computer program a screen mask that overlays a displayed graphical user interface generated by the computer program, the screen mask configurable post-installation for:
allowing user actions with respect to a first predetermined portion of the graphical user interface in dependence upon the states of a set of feature properties relating to features of the full featured framework of the computer program established post-installation of the full featured framework of the computer program, wherein each feature of the features of the full featured framework has a state that is at least one of an enabled state, a disabled state, or a hidden state; and
blocking user actions with respect to a second predetermined portion of the graphical user interface in dependence upon the states of the features relating to the set of features of the full featured framework of the computer program established post-installation of the full featured framework of the computer program;
receiving from a feature server during execution of the installed full featured framework of the computer program a set of feature properties, the feature server storing within a database sets of feature properties where each set of feature properties associated with a unique identity of at least one of an installation of the full featured framework of the computer program and a computer having the full featured framework of the computer program installed upon it and each feature property having a state;
transmitting to a remote computer the set of features associated with the unique identity upon validation of the unique identity, wherein the set of feature properties transmitted to the remote computer configure a predetermined sub-set of the features of the already installed full featured framework of the computer program post-installation, the configuration of each feature within the sub-set of the features being made in dependence upon only the state of a feature property within the set of feature properties associated with that feature and the already installed full featured framework of the computer program; and
transmitting to the feature server a change with respect to enabling a feature property in response to a user initiated request to enable the feature property and an associated enabling of a feature within the plurality of features controlled by the feature property, wherein the user initiated request is generated in response to an action of the user within a graphical user interface displayed to the user during their normal use of the full featured framework of the computer program which displays at least a subset of the currently enabled features of the full featured framework of the computer program.

23. The method according to claim 22, wherein the set of feature properties associated with the unique identity stored on the feature server can be adjusted by an authorised party in dependence upon a determination by the authorised party with respect to the validity of the installation of the computer program to render the installed computer program to a limited state of use.

* * * * *